United States Patent
Saitou et al.

(10) Patent No.: US 7,413,042 B2
(45) Date of Patent: Aug. 19, 2008

(54) DRIVE CONTROLLER FOR HYBRID VEHICLE

(75) Inventors: Tetsushi Saitou, Shizuoka-ken (JP); Arai Katsuhiro, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 117 days.

(21) Appl. No.: 11/389,514

(22) Filed: Mar. 24, 2006

(65) Prior Publication Data
US 2006/0219447 A1 Oct. 5, 2006

(30) Foreign Application Priority Data
Mar. 24, 2005 (JP) ............... 2005/086419

(51) Int. Cl.
B60K 1/00 (2006.01)
B60K 6/00 (2007.10)
(52) U.S. Cl. .................. 180/65.2; 180/65.3; 180/65.6; 701/22
(58) Field of Classification Search ............... 180/65.2, 180/65.3, 65.4, 65.8, 65.6; 701/22, 104, 701/54; 318/139, 262; 903/917, 927, 940, 903/903
See application file for complete search history.

(56) References Cited

U.S. PATENT DOCUMENTS

| | | | | |
|---|---|---|---|---|
| 5,588,498 | A * | 12/1996 | Kitada | 180/65.4 |
| 6,252,377 | B1 * | 6/2001 | Shibutani et al. | 320/132 |
| 6,752,226 | B2 * | 6/2004 | Naito et al. | 180/65.3 |
| 6,994,652 | B2 * | 2/2006 | Atarashi et al. | 477/3 |
| 7,006,906 | B2 * | 2/2006 | Kobayashi et al. | 701/22 |
| 7,023,102 | B2 * | 4/2006 | Itoh | 290/40 C |

(Continued)

FOREIGN PATENT DOCUMENTS

JP 2-7702 1/1990

(Continued)

OTHER PUBLICATIONS

Co-Pending U.S. Appl. No. 11/384,026, filed Mar. 16, 2006 in the name of Tetsushi Saitou.

*Primary Examiner*—Hau V Phan
(74) *Attorney, Agent, or Firm*—Knobbe Martens Olson & Bear LLP (57) ABSTRACT

A hybrid vehicle includes an engine for generating power through fuel consumption, a generator driven at least by the engine for generating power, a battery charged by the generator, a motor driven by at least the electric power from the generator or the battery to generate power, and a drive wheel that is rotated by the power of at least one of the engine and the motor. The hybrid vehicle also includes a drive controller with a control section configured to regulate the speed of the generator driven by the engine, and configured to charge the battery with the power generated by the generator. The drive controller also comprises a battery current detector that produces a signal indicative of an amount of current supplied from the generator to the battery, the control section receiving said signal. The control section is configured to cause a throttle opening of the engine to decrease while controlling the generator to keep a rotational speed of the generator above about 80% of an upper rotational speed limit. In this manner, the drive controller inhibits the current supplied from the generator to the battery from exceeding a permissible charging current value set for the battery during the charging of the battery.

9 Claims, 7 Drawing Sheets

U.S. PATENT DOCUMENTS

| | | | |
|---|---|---|---|
| 7,047,116 B2 * | 5/2006 | Ishikawa et al. | 180/65.3 |
| 7,071,642 B2 * | 7/2006 | Wilton et al. | 180/65.2 |
| 7,228,209 B2 * | 6/2007 | Izawa et al. | 701/22 |
| 2004/0055799 A1 * | 3/2004 | Atarashi et al. | 180/65.2 |
| 2004/0207348 A1 * | 10/2004 | Wilton et al. | 318/139 |
| 2004/0213371 A1 * | 10/2004 | Bruder et al. | 378/9 |
| 2007/0029121 A1 * | 2/2007 | Saitou et al. | 180/65.2 |

FOREIGN PATENT DOCUMENTS

| | | |
|---|---|---|
| JP | 2000-343964 | 12/2000 |

* cited by examiner

DRIVE CONTROLLER FOR HYBRID VEHICLE

CROSS-REFERENCE TO RELATED APPLICATIONS

The present application is based on and claims priority under 35 U.S.C. § 119 to Japanese Patent Application No. 2005-086419, filed on Mar. 24, 2005, the entire contents of which is expressly incorporated by reference herein.

BACKGROUND OF THE INVENTION

1. Field of the Invention

The present invention relates to a drive controller for a hybrid vehicle.

2. Description of the Related Art

From an environmental standpoint, it is desirable to have engine-driven vehicles emit as little environmental contaminants as possible. This interest has lead to the current development of hybrid vehicles mounted with an electric motor, in addition to an internal combustion engine, for driving the drive wheels of the vehicle.

A hybrid vehicle uses mainly an electric motor as the power source during steady running conditions to reduce noise and air pollution. A conventional hybrid vehicle also uses an engine in combination with the electric motor in order to compensate for the drawbacks inherent in an electric automobile driven by an electric motor. The additional use of the engine makes it possible to overcome the problems associated with driving the vehicle with the electric motor alone, such as the rather short distance that can be traveled on a single battery charge and the difficulty of effecting such operations as rapid start, high-load running, and high-speed running because the generated torque is small.

A hybrid vehicle can be a parallel type hybrid vehicle in which the drive wheels are alternatively driven by at least one of the engine and the motor according to the running conditions or the amount of electric energy remaining in a battery (secondary battery) that is charged by a generator. A hybrid vehicle can also be a series type hybrid automobile whose generator is driven by an engine, the generator generating electric power to operate a drive motor, which in turn drives the driving drive wheels.

Further, there also exist so-called series/parallel hybrid automobiles such as the one described in Japanese Patent Publication No. JP-U-Hei 2-7702, which combines the series type and parallel type hybrid structures.

With such a hybrid automobile (e.g., having both an engine and an electric motor as drive sources), when the output of the generator generated by the operation of the engine exceeds the power consumed by the motor, such as during low-speed, high-load running, the resultant surplus power is used to charge the battery.

However, an excessive charging current may be supplied to the battery, which may cause overheating of the battery. In this regard, the general construction of a hybrid automobile allows a sufficient space to be secured with respect to the mounting weight of the battery, which is calculated from the required drive force (discharging operation) corresponding to an operation by the user (vehicle driver). Thus, in a hybrid automobile, the permissible charging current for the battery is sufficiently large. That is, the hybrid automobile is mounted with a battery that is sufficiently large to permit supply of the charging current generated by the drive of the generator.

In recent years, it has been desired to mount the hybrid drive unit described above on two-wheeled vehicles, such as a motorcycle. In general, the space for mounting a drive unit in a two-wheeled vehicle is limited to the space between the front wheel and the rear wheel and under the seat within the vehicle body. Moreover, the width of a two-wheeled vehicle is also small as compared with that of an automobile.

For this reason, when mounting the hybrid drive unit constructed as described above to a two-wheeled vehicle, it is difficult to mount a battery of a volume sufficient to permit the supply of the charging current generated by the generator during low-speed, high-load running conditions or the like.

SUMMARY OF THE INVENTION

The present invention has been made in view of the problems described above. It is an aspect of the present invention to provide a drive controller for a hybrid vehicle that is capable of effectively directing the output of the generator, generated by the drive of the engine, to charge the battery, even when the drive controller is mounted in a vehicle with limited space, such as a two-wheeled vehicle.

In accordance with one aspect of the present invention, a hybrid vehicle with a drive controller is provided. The hybrid vehicle has an engine for generating power through fuel combustion, a generator driven at least by the engine for generating power, a battery charged by the generator, a motor driven by at least the electric power from the generator or the battery to generate power, and a drive wheel that is rotated by the power of at least one of the engine and the motor. The drive controller comprises a control section configured to regulate the speed of the generator driven by the engine, and configured to charge the battery with the power generated by the generator. The drive controller also comprises a battery current detector producing a signal indicative of an amount of current supplied from the generator to the battery, the control section receiving the signal. The control section is configured to cause a throttle opening of the engine to decrease while controlling the generator to keep a rotational speed of the generator above about 80% of an upper rotational speed limit. In this manner, the drive controller inhibits the current supplied from the generator to the battery from exceeding a permissible charging current value set for the battery during the charging of the battery.

In accordance with another aspect of the present invention, a hybrid vehicle with a drive controller is provided. The hybrid vehicle has an engine for generating, power through fuel combustion, a generator driven by at least the engine for generating electric power, a battery charged by the generator, a motor driven by at least the electric power from the generator or the battery to generate power, and a drive wheel that is rotated by the power of at least one of the engine and the motor. The drive controller comprises a control section configured to regulate the speed of the generator driven by the engine, and configured to charge the battery while the engine generates a drive torque by controlling the electric power generated by the generator at least when a vehicle speed decreases below a predetermined speed. The drive controller also comprises a battery current detector producing a signal indicative of an amount of current supplied from the generator to the battery, the control section receiving the signal. The control section is configured to cause a throttle opening of the engine to decrease while controlling the generator to keep a rotational speed above about 80% of an upper rotational speed limit.

In accordance with yet another aspect of the invention, a method for controlling the operation of a hybrid vehicle is provided. The hybrid vehicle has an internal combustion engine, a generator driven by the engine to generate electric power, a battery charged with said electric power at least from the generator, and a motor that receives electric power from at least one of the generator and battery. At least one of the engine and motor drives a drive wheel of the vehicle. The method comprises supplying electric power to the battery to charge the battery and detecting a current supplied to the battery. The method also comprises controlling a rotational speed of the generator to inhibit the current supplied from the generator to the battery from exceeding a set charge current value for the battery.

According to the structures described above, in order to prevent the current supplied from the generator to the battery from exceeding the value of the permissible charging current set for the battery (i.e., an overcurrent), the throttle opening of the engine, for example, can be reduced while keeping the rotational speed of the generator at its upper limit or not lower than 80% of the upper limit. The reduction in throttle opening allows a decrease in torque generated by the engine, thereby reducing the output of the generator driven by the engine.

During vehicle operating conditions, such as the low-speed high-load running condition, the current supplied from the generator to the battery does not become larger than the permissible charging current value set for the battery. Therefore, engine control can be performed without increasing the volume of the battery in order to prevent an overcurrent. In addition, an overcurrent can be prevented from being supplied to the battery, thereby achieving extended battery life. Further, the volume of the battery can be reduced.

According to aspects of the present invention described above, a situation can be avoided where the current supplied from the generator to the battery becomes larger than the permissible charging current value set for the battery, thereby enabling control of a hybrid drive unit without increasing the volume of the battery. Even in the case of mounting a drive controller to a two-wheeled vehicle, the output of the generator generated by the operation of the engine can be effectively directed to charging of the battery.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 7 figures.

DETAILED DESCRIPTION OF THE PREFERRED EMBODIMENT

As used herein, a "drive unit" refers to an assembled unit, which may have a plurality of components, all of which may or may not be held in a common housing. Additionally, as used in the embodiments herein, the terms "front," "forward," "rear," "rearward," "left," "right," "top," "upper," "bottom" and "lower" are defined from the perspective of a user riding the hybrid vehicle.

Figure 1:
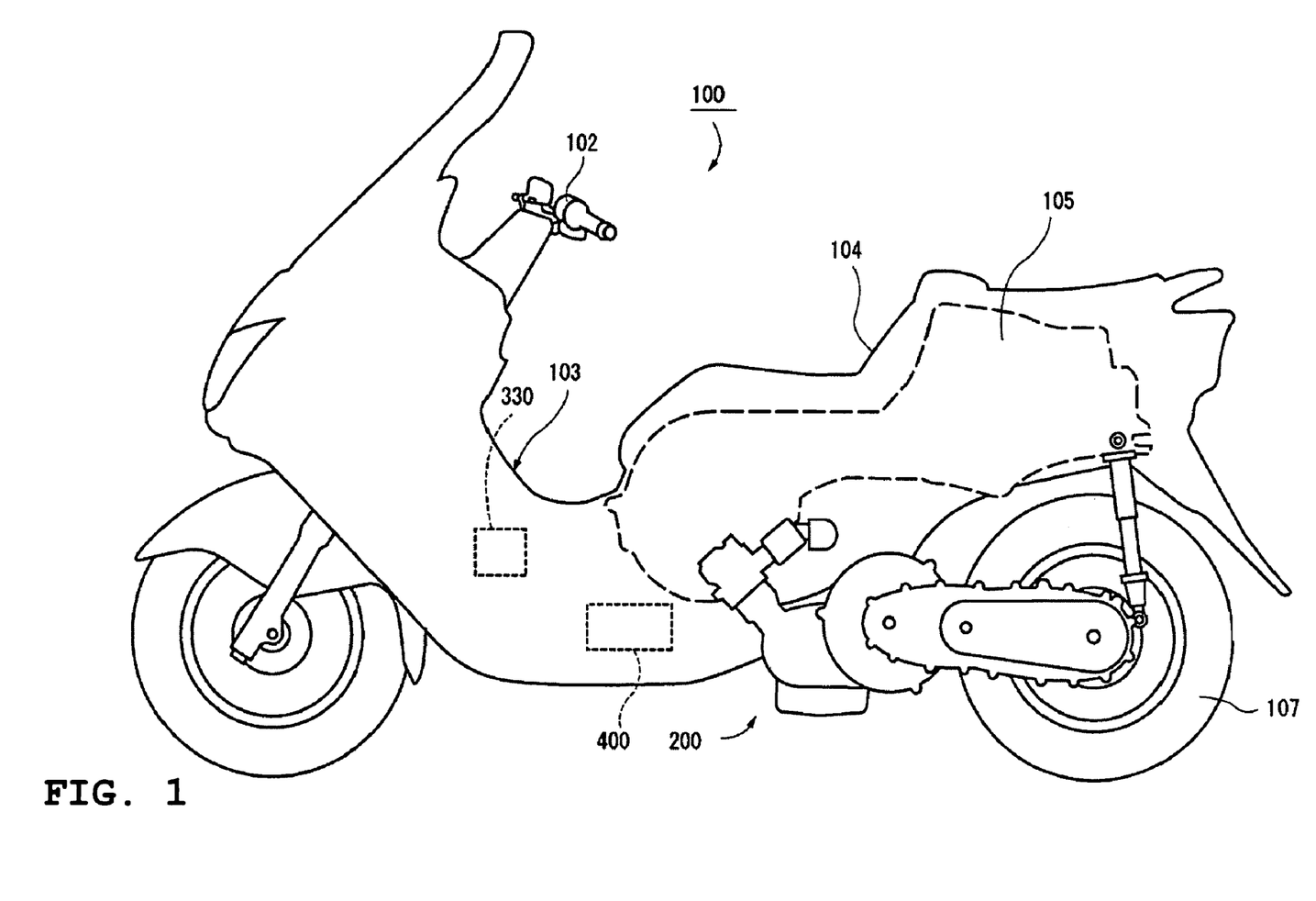
FIG. 1 is a left side schematic view showing the construction of a scooter type two-wheeled vehicle with a drive controller for a hybrid vehicle mounted thereon according to one embodiment.

FIG. 1 is a left side schematic view showing the construction of a scooter type two-wheeled vehicle representing an example of a hybrid vehicle mounted with one embodiment of a hybrid vehicle drive controller.

The hybrid vehicle shown in FIG. 1 is a series/parallel hybrid scooter type two-wheeled vehicle whose engine and motor are used, individually or in combination, as power sources to drive the drive wheels. More specifically, the hybrid vehicle (hereinafter, referred to as the "scooter type two-wheeled vehicle") uses a power dividing mechanism to divide the engine power into two parts. One part is used for directly drive the drive wheels. The second part is used to generate electric power. The usage ratios of the two types of power can be variably controlled.

In a scooter type two-wheeled vehicle 100 shown in FIG. 1, a tandem seat 104 and a trunk space 105 are disposed in a vertical arrangement on the rear side of a vehicle body 103. The vehicle body 103 pivotally supports a handlebar 102 on the front side thereof. A drive unit 200 is arranged generally below the trunk space 105. The scooter type two-wheeled vehicle 100 also has a drive controller (hereinafter, referred to as the "controller") 300 (see FIG. 3) for controlling the drive unit 200.

Figure 2:
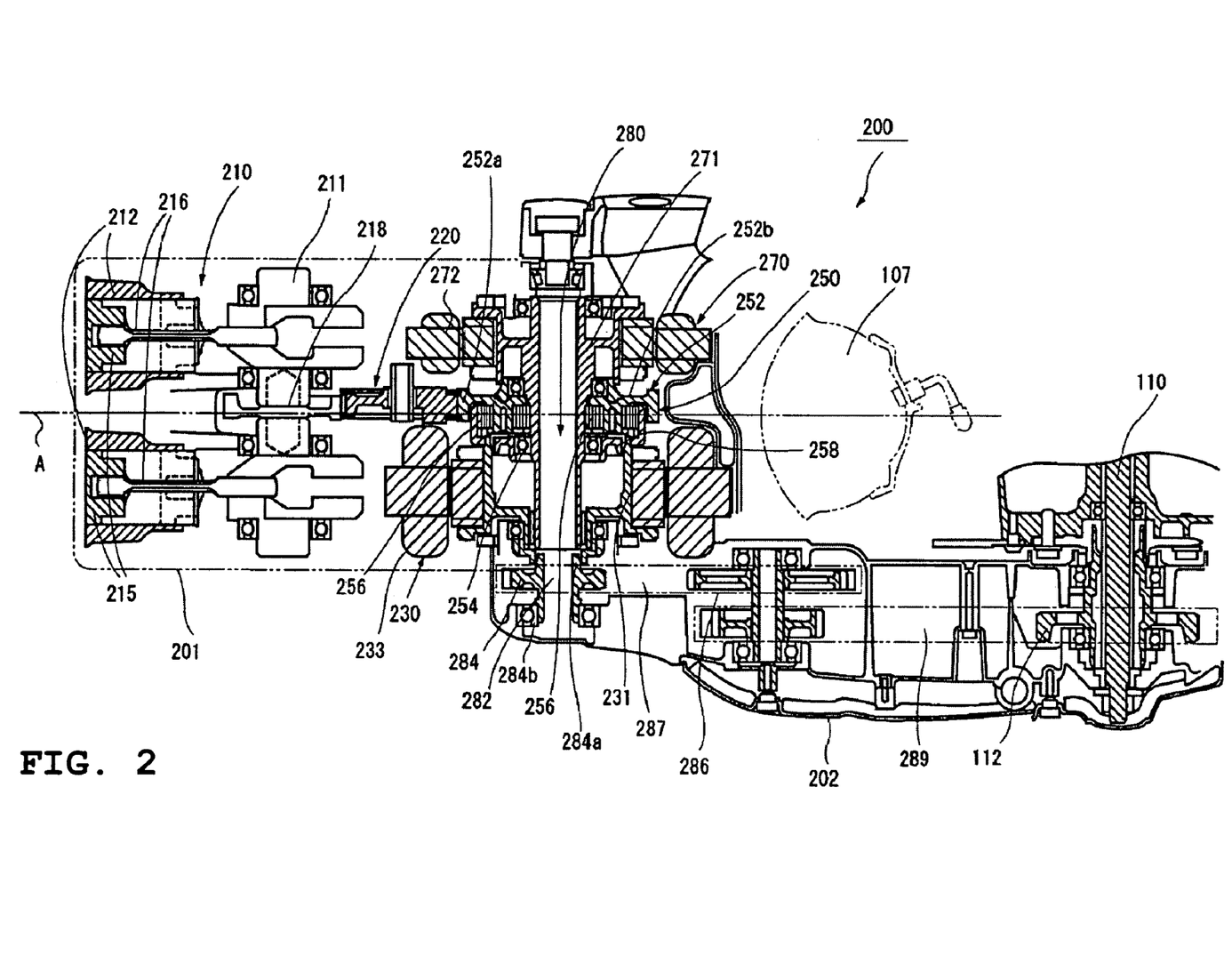
FIG. 2 is a plan schematic view showing the general construction of a drive unit of the scooter type two-wheeled vehicle shown in FIG. 1.

FIG. 2 is a plan schematic view showing the general construction of the drive unit 200 mounted to a hybrid vehicle, such as the scooter type two-wheeled vehicle 100.

The drive unit 200 shown in FIG. 2 includes a unit body 201, an engine 210, a motor 230, a power distributor 250, and a generator 270.

The engine 210 is preferably a two-cylinder engine, which is provided below the trunk space 105 (see FIG. 1) of the scooter type two-wheeled vehicle 100. In the engine 210, as seen in plan view, the respective axes of two cylinders 212 extend generally parallel to each other and are arranged at laterally symmetrical positions with respect to a vehicle center axis A. A crankshaft 211 of the engine 210 is preferably arranged substantially in parallel to the vehicle width direction (e.g., a direction generally perpendicular to the vehicle center axis A).

Pistons 215 inside the respective cylinders 212 of the engine 210 are connected to the crankshaft 211 through corresponding connecting rods 216. Accordingly, the crankshaft 211 rotates as the piston 215 moves generally vertically. That is, by rotating the crankshaft 211, the piston 215 moves vertically, whereby the engine 210 itself is driven.

The crankshaft 211 has a crank gear 218, which transmits power to the power distributor 250, provided between the respective large end portions of the connecting rods 216 of the pistons 215.

The crank gear 218 is preferably in meshing engagement with an intermediate gear 220 that rotates about a shaft generally parallel to the crankshaft 211, and the intermediate gear 220 is preferably in meshing engagement with a gear 252a formed in the outer periphery of a planetary carrier 252 of the power distributor 250.

With the crankshaft 211 being connected to the power distributor 250 through the intermediate gear 220, as described above, the torque of the crankshaft 211 can be transmitted to the power distributor 250. Similarly, the drive force from the power distributor 250 can be transmitted to the crankshaft 211.

The power distributor 250 is preferably arranged on, and rotates about, one shaft together with the motor 230 and the generator 270, where the shaft extends generally parallel to the crankshaft 211. More specifically, the power distributor 250 is arranged on a power shaft 280, which in the illustrated embodiment is formed by axially extending the shaft portion of a rotor 271 of the generator 270. The power distributor 250 rotates about the power shaft 280. The motor 230 and the generator 270 also preferably rotate about the axial center of the power shaft 280.

The power distributor 250 preferably appropriately distributes the drive force transmitted from the engine 210 to a vehicle drive force that is transmitted to a vehicle shaft 110 to directly drive a rear wheel 107, and to a generator drive force for enabling the generator 270 to generate electric power.

Further, the power distributor 250 is preferably provided on the power shaft 280 so as to be positioned between the motor 230 and the generator 270.

In the power distributor 250, the planetary carrier 252, which is brought into meshing engagement with the intermediate gear 220 via the gear 252a formed on the outer periphery thereof, is disposed so as to be coaxially rotatable with respect to the power shaft 280 while located axially adjacent to a sun gear 254 provided on the outer peripheral surface of the power shaft 280.

The planetary carrier 252 has a planetary pin 252b extending generally in parallel to the power shaft 280 and provided on the concentric circle drawn around the axial center of the power shaft 280, with a planet gear 256 being rotatably fastened to the planetary pin 252b.

The planet gear 256 preferably meshingly engages the sun gear 254, and revolves around the sun gear 254 while rotating on its own axis. It should be noted that the sun gear 254 is preferably formed integrally with the shaft portion of the rotor 271 of the generator 270, so as to constitute a part of the power shaft 280.

Further, a ring gear 258, whose inner periphery surface preferably meshes with each planet gear 256, is arranged along the outer periphery of the planet gear 256.

The ring gear 258 preferably combines with a rotor 231 of the motor 230. As the ring gear 258 rotates about the axial center of the power shaft 280, the rotor 231 also rotates about the same axial center. The rotation of the rotor 231 causes the motor 230 to generate a drive force.

With the power distributor 250, when the planetary carrier 252 rotates due to the drive force from the crankshaft 211, the planetary pin 252b provided integrally with the planetary carrier 252 also rotates about the axial center of the power shaft 280. Following this, the planet gear 256 similarly rotates and revolves around the sun gear 254. Then, both the sun gear 254 and the ring gear 258 rotate together as they mesh with the planet gear 256.

Since the sun gear 254 is formed in the power shaft 280 and integrated with the shaft portion of the rotor 271 of the generator 270, the rotor 271 also rotates when the sun gear 254 rotates. Accordingly, the torque of the sun gear 254 serves as the generator drive force, causing the generator 270 to generate electric power.

The generator 270, which is rotatably disposed inside a stator 272, preferably generates electric power through rotation of the rotor 271 constituting the power shaft 280 and supplies the electric power thus generated to a battery 400 (see FIGS. 1 and 3) and to the motor 230. The generator 270 may also function as a motor that is driven by a supply of electric power from the battery 400. For example, the generator 270 may function as a cell motor for starting the engine 210 when the charge amount of the battery 400 is equal to or lower than a predetermined value. The battery 400 stores the electric power supplied from the generator 270 and supplies electric power to the motor 230 and the generator 270.

The power shaft 280 is preferably inserted through the body of the generator 270 and through the power distributor 250 from a lateral side face (the right-hand side, in the illustrated embodiment) of the vehicle. The power shaft 280 is rotatably inserted into the body of the motor 230 arranged on the other lateral face side (left-hand side) of the vehicle.

The motor 230 preferably has its rotary shaft located on the same axis as the power shaft 280. The motor 230 is also preferably arranged forward of the rear wheel 107 and situated side by side with the generator 270, with the power distributor 250 therebetween. Herein, the rotor 231, which is arranged inside a stator 233 so as to be rotatable about the axial center of the power shaft 280, is preferably formed in a cylindrical configuration, with the power shaft 280 being rotatably inserted therein.

In one embodiment, the motor 230 may function as a cell motor for starting the engine 210 when the charge amount of the battery is lower than a predetermined value. Further, during acceleration or braking, the motor 230 preferably functions as a regenerative motor that generates a resistance force for suppressing the rotation of the vehicle shaft 110 in the direction of motion.

Further in the motor 230, joined to the rotor 231 is one end portion 284a of a cylindrical body portion 282 of a sprocket 284, which rotates about the same axial center as that of the power shaft 280 on the other lateral face side (left-hand side) of the vehicle. The body portion 282 of the sprocket 284 is preferably supported by a bearing 284b at its end on the other end portion side (the other lateral face side of the vehicle).

In the illustrated embodiment, the torque of the power shaft 280 is preferably transmitted to the sprocket 284 by way of the sun gear 254, the planet gear 256, the ring gear 258, and the rotor 231. Then, the torque is preferably transmitted from the sprocket 284 to the vehicle shaft 110 by way of a chain 287 wound around the sprocket 284, a reduction gear portion 286, a chain 289, and a sprocket 112 of the vehicle shaft 110, which is arranged in the rear of the vehicle to thereby drive the rear wheel 107. In the illustrated embodiment, the sprocket 284, the chain 287, the reduction gear portion 286, the chain 289, and the sprocket 112 are preferably disposed inside a cantilevered rear arm portion 202 of the drive unit 200.

As described above, in the power distributor 250 employing a planet gear mechanism, the engine 210, the motor 230, and the generator 270 are preferably connected to one another through the planetary carrier 252, the ring gear 258, and the sun gear 254. In the power distributor 250, by determining the rotational speeds of two gears among the planetary carrier 252, the ring gear 258, and the sun gear 254, the rotational speed of the remainder can also be indirectly determined.

Accordingly, of the rotational speed of the generator 270 (e.g., of the rotor 271), the rotational speed of the motor 230 (e.g., of the rotor 231), and the rotational speed of the engine 210, when two of the rotational speeds are determined, then the remainder is indirectly determined. That is, by determining the rotational speed of the generator 270 and the rotational speed of the motor 230, the rotational speed of the engine 210 is indirectly determined. The rotation speed of the rotor 231 is preferably in synchronism with the rotation speed of a drive wheel, such as the rear wheel 107, or with the vehicle running speed. By controlling the rotation speed of the generator 270, the rotational speed of the engine 210 can be determined.

With the scooter type two-wheeled vehicle 100 equipped with the drive unit 200 as described above, the rear wheel 107 is preferably rotated by at least one of the engine 210 and the motor 230 through the power distributor 250. How the engine 210 and the motor 230 operate, that is, the operation of the drive unit 200, is determined on the basis of the running conditions of the vehicle or the charge amount of the battery 400 (see FIGS. 1 and 3) to be charged with electric power for driving the motor 230.

With the scooter type two-wheeled vehicle 100 equipped with the drive unit 200 as described above, the controller 300 (see FIG. 3) including a control unit 330 (see FIG. 1) controls the drive force.

Figure 3:
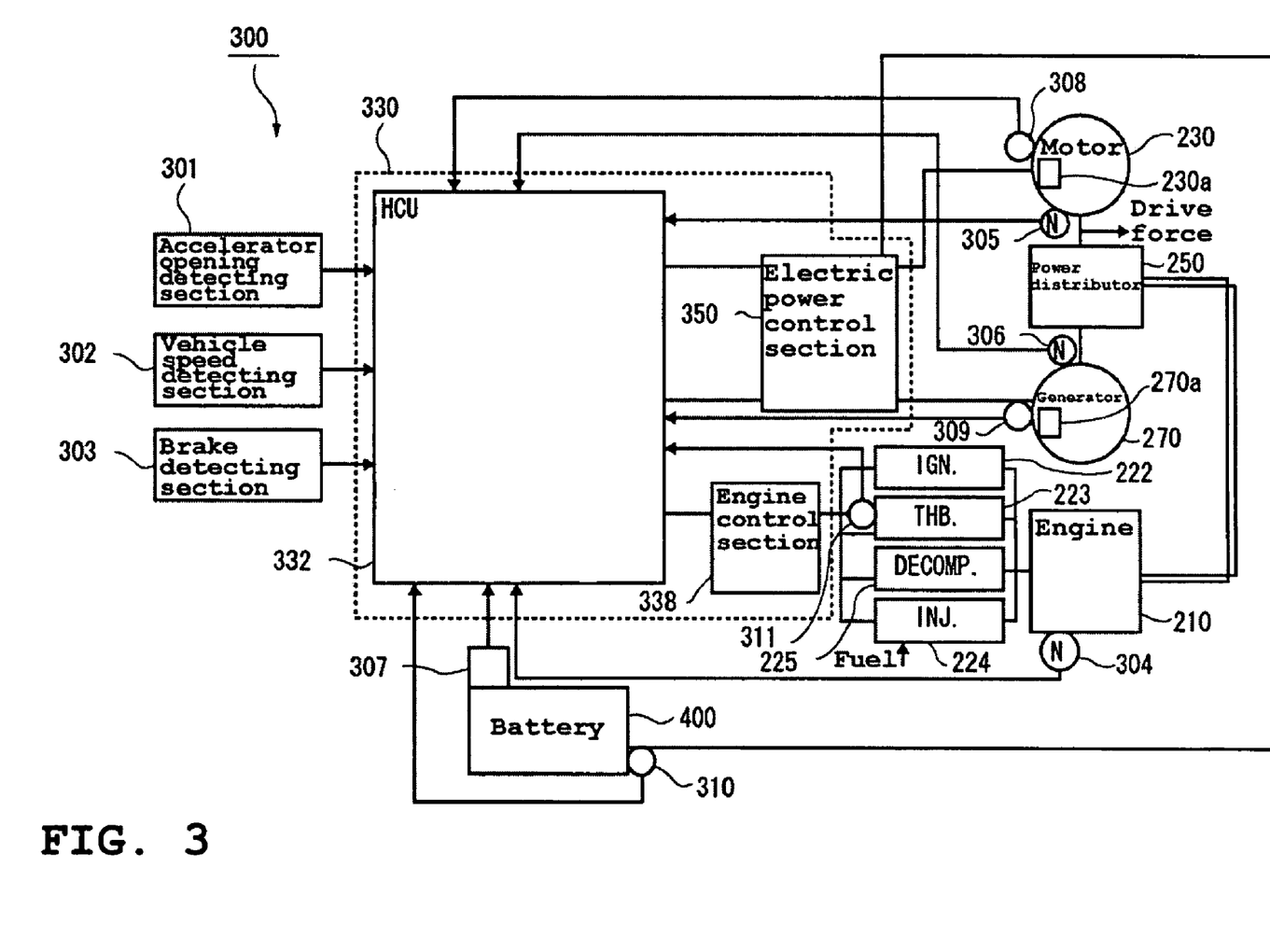
FIG. 3 is a schematic block diagram of the general configuration of the drive controller in the scooter type two-wheeled hybrid vehicle of FIG. 1.

FIG. 3 is a block diagram for explaining the general configuration of the controller 300 in the scooter type two-wheeled vehicle 100. In FIG. 3, the lines connecting the power distributor 250, the engine 210, the motor 230, and the generator 270 are power transmission lines indicating mechanically transmitted power.

In the illustrated embodiment, other than the control unit 330, the controller 300 has an accelerator opening detecting section 301, a vehicle speed detecting section 302, a brake detecting section 303, an engine rotational speed sensor 304, a motor rotational speed sensor 305, a generator rotational speed sensor 306, a remaining battery charge sensor 307, a motor current sensor 308, a generator current sensor 309, a battery current sensor 310, a throttle opening sensor 311, and the like. In other embodiments, the controller 300 can include more or fewer components than illustrated in the embodiment of FIG. 3.

The accelerator opening detecting section 301 preferably detects the degree of accelerator opening, which can be varied through operation of the accelerator by the driver of the scooter type two-wheeled vehicle 100. The accelerator opening detecting section 301 outputs the accelerator opening to the control unit 330 in the form of an accelerator opening information signal. The vehicle speed detecting section 302 preferably detects the vehicle speed and outputs it to the control unit 330 in the form of a vehicle speed information signal. Further, the brake detecting section 303 preferably detects the degree of brake lever operation by the vehicle driver and outputs it to the control unit 330 in the form of a brake information signal.

Further, the rotational speed sensors 304, 305, and 306 preferably detect the rotational speeds of the engine 210, motor 230, and generator 270, respectively, and output them to the control unit 330 in the forms of an engine rotational speed information signal, a motor rotational speed information signal, and a generator rotational speed information signal, respectively.

The remaining battery charge sensor 307 preferably detects the charge storage state of the battery 400. That is, the remaining battery charge sensor 307 detects the remaining battery charge and outputs it to the control unit 330 in the form of a remaining battery charge information signal.

The motor current sensor 308 preferably detects the current input into the motor 230 and the current output from motor 230, and outputs them to the control unit 330 in the form of motor input/output current information signals (hereinafter, referred to as the "motor current information signal").

The generator current sensor 309 preferably detects the current input into the generator 270 and the current output from the generator 270, and outputs them to the control unit 330 in the form of generator input/output current information signals (hereinafter, referred to as the "generator current information signal").

The battery current sensor 310 preferably detects the current input to the battery 400 and the current output from the battery 400, and outputs them to the control unit 330 in the form of battery input/output current information signals (hereinafter, referred to as the "battery current information signal").

Further, the throttle opening sensor 311 preferably detects the throttle of the engine 210. More specifically, the throttle opening sensor 311 detects the valve opening of a throttle valve 223, and outputs it to the control unit 330 in the form of a throttle opening information signal.

On the basis of the information input from the respective detecting sections 301 to 303 and the respective sensors 304 to 311, the control unit 330 preferably controls the operation of the engine 210, motor 230, generator 270, and battery 400, thereby controlling the operation of the vehicle.

In the illustrated embodiment, the control unit 330 has a hybrid control unit (hereinafter, referred to as the "HCU") 332. The HCU 332 preferably is a main control section for controlling the operation of the vehicle. However, in other embodiments, the HCU 332 can be a stand-alone component that interacts with other components, which control various operations of the vehicle. In the illustrated embodiment, the control unit 330 also has an electric power control section 350 for effecting input/output control on the motor 230, the generator 270, and the battery 400, and an engine control section 338.

The accelerator opening information signal, the vehicle speed information signal, and the brake information signal are input to the HCU 332 from the accelerator opening detecting section 301, the vehicle speed detecting section 30, and the brake detecting section 303, respectively. Further, the engine rotational speed information signal, the motor rotational speed information signal, and generator rotational speed information signal from the rotational speed sensors 304 to 306, respectively, and the remaining battery charge information signal from the remaining battery charge sensor 307 are input to the HCU 332. Further input to the HCU 332 are the motor current information signal, the generator current information signal, and the battery current information signal from the respective current sensors 308 to 310, and the throttle opening information signal from the throttle opening sensor 311.

The HCU 332 outputs drive commands to the electric power control section 350 and the engine control section 338 on the basis of the input information signals, thereby effecting control to achieve operations corresponding to maneuvers of the vehicle driver.

In other words, the HCU 332 identifies the operational state of the vehicle, including the stopped state, on the basis of the accelerator opening information signal, the vehicle speed information signal, the brake information signal, the respective rotational speed information signal, the respective current information signal, the remaining battery charge information signal on the battery 400, and the throttle opening information signal, and controls the operation of the vehicle according to the operational state of the vehicle thus identified.

In a preferred embodiment, the HCU 332 makes a determination whether to stop the engine 210, to run the vehicle solely by the motor 230, or to start the engine 210 to run the vehicle by the engine power based on the input information signals. Then, the HCU 332 controls the operation of the vehicle such that, upon starting, the vehicle starts running with the motor 230, except when the temperature is low or when the amount of remaining battery charge is small.

In one embodiment, when running the vehicle by engine power, the HCU 332 preferably starts the engine 210 using the generator 270 and the motor 230, and at the same time calculates the energy required for the vehicle as a whole. Then, the HCU 332 calculates the most efficient operational condition for generating the calculated energy, sends a corresponding command to the engine control section 338, and also performs rotation control on the generator 270 through the electric power control section 350, so as to achieve the required engine rotational speed.

The engine power is controlled by the HCU 332 while being combined with the power for effecting direct drive and the power for effecting motor drive by electric power generation and, depending on the state of the battery 400, further the charge amount. At this time, the HCU 332 controls the drive of the vehicle by using the engine 210 or the motor 230 and the generator 270 so as to minimize the overall energy consumption by the vehicle, that is, to achieve the best possible energy efficiency.

Specifically, when the operational state of the vehicle is in the phase of poor engine efficiency, such as during slow start/low-to-intermediate speed running (steady running up to intermediate speed), the HCU 332 preferably stops the engine 210 and controls the operation of the vehicle solely via the motor 230.

That is, when, on the basis of the input accelerator opening information signal, vehicle speed information signal, and the brake information signal, the HCU 332 determines that the vehicle is starting slowly or running at low-to-intermediate speed, the HCU 332 outputs an engine stop command to the engine control section 338 and outputs a motor drive command to the electric power control section 350.

The motor drive command output by the HCU 332 serves as a command for making the drive force generated by the operation of the motor be a drive force that corresponds to the accelerator opening information. The electric power control section 350, having received this motor drive command, causes the motor 230 to operate, thereby rotating the rear wheel 107.

Further, when the operational state of the vehicle is that of steady running, the HCU 332 causes the engine 210 to operate to thereby directly rotate the rear wheel 107, and causes the generator 270 to operate via the operation of the engine 210, the motor 230 being driven by the resultant electric power generated to thereby rotate the rear wheel 107. That is, upon determining that the vehicle is running in a steady state on the basis of the input accelerator opening information signal, the vehicle speed information signal, and the brake information signal, the HCU 332 outputs a drive command to the engine control section 338 to thereby operate the engine 210 and causes the motor 230 and the generator 270 to operate via the electric power control section 350.

The engine power in the above operating condition is preferably split into two paths by the power distributor 250. The generator 270 is driven using one of the two paths and the resultant generated electric power causes the motor 230 to operate, thereby rotating the rear wheel 107. Further, the engine power is transmitted to the vehicle shaft 110 through the other path, thereby rotating the rear wheel 107.

In the case where the engine drive force is to be transmitted through the two paths during steady running, as described above, the ratios of the engine power respectively transmitted through the two paths are preferably controlled so as to achieve the maximum usage efficiency of the overall energy consumed by the vehicle.

That is, while the engine 210 is operating, the HCU 332 controls the electric power generation output of the generator 270 so as to prevent abrupt or large fluctuations in the rotational speed of the engine 210 detected by the rotational speed sensor 304. In other words, the HCU 332 controls the electric power generation output of the generator 270 so as to reduce the emissions and fuel consumption by the engine 210 in comparison to vehicles with conventional engines (e.g., internal combustion engines). At the same time, the HCU 332 controls the electric power generation output of the generator 270, that is, the rotational speed of the engine, so that the remaining charge of the battery 400 is maintained within a predetermined range at all times. In other words, the HCU 332 controls the electric power generation output of the generator 270 so that the fluctuations in the remaining charge of the battery 400 due to the drive of the motor 230 take place within a predetermined range.

Further, when the operational state of the vehicle is that of rapid acceleration, the HCU 332 preferably controls the supply of electric power to the motor 230 from the battery 400 together with the engine drive force, the rear wheel 107 being driven by using the drive force of the motor 230 due to the electric power supplied from the battery 400.

That is, upon determining that the vehicle is undergoing rapid acceleration based on the accelerator opening information signal, the vehicle speed information signal, and the braking information signal, the HCU 332 outputs an engine drive command to the engine control section 338 and outputs a drive command to the electric control section 350.

Further, the HCU 332 outputs a control command to each of the engine control section 338 and the electric power control section 350 to supply electric power from the battery 400 to the motor 230.

As a result, during rapid acceleration, the vehicle shaft 110 is rotated by the engine power, which is obtained through the power shaft 280 (see FIG. 2), and by the drive force of the motor 230 that is driven by the electric power supplied from the battery 400. The vehicle thus advantageously exhibits smooth power performance with good response, thereby achieving further improvement in acceleration performance.

Further, when the operational state of the vehicle is that of deceleration/braking, the HCU 332 preferably controls the operation of the vehicle such that the rear wheel 107 drives the motor 230. That is, upon determining that the vehicle is under deceleration/braking on the basis of the input information signals, in particular the brake information signal, the HCU 332 outputs a motor regeneration command to the electric power control section 350, causing the motor 230 to operate as a generator, thereby converting the braking energy of the vehicle into as much electric power as possible.

That is, in accordance with the brake information signal, the HCU 332 causes the motor 230 to act as a regeneration brake. In this operating state, the HCU 332 performs AC to DC conversion on the regenerated output from the motor 230, and supplies the electric power collected by the motor 230 to the battery 400.

Further, the HCU 332 preferably controls the operation of the vehicle so as to allow the battery 400 to maintain a constant charged state, that is, to make fluctuations in the remaining charge of the battery 400 small. When the charge of the battery 400 becomes small, the HCU 332 causes the engine 210 to start to thereby drive the generator 270, thereby starting the charging of the battery 400. In this operating state, the HCU 332 controls the operation of the vehicle on the basis of the remaining battery charge information signal input from the remaining battery charge sensor 307 in addition to the accelerator opening information signal, the vehicle speed information signal, and the brake information signal that are input.

For instance, when the battery 400 alone cannot provide the electric power to be supplied to the motor 230, or when the remaining charge of the battery 400 input has dropped to a predetermined level or below, the HCU 332 causes the engine control section 338 to start the engine 210. That is, when charging the battery 400, the HCU 332 causes the engine control section 338 to give a start signal to an ignition 222, thereby starting the engine 210.

It should be noted that when the electric power supplied from the generator 270 to the battery 400 exceeds a predetermined level, the HCU 332 causes the engine control section 338 to control the output generated by the engine 210 to thereby reduce the electric power generated by the generator 270. Alternatively, the HCU 332 stops the drive of the generator 270 to thereby stop the supply of electric power to the battery 400, or supplies the electric power from the generator 270 to the motor 230 instead of the battery.

Further, when the vehicle is at rest, the HCU 332 preferably controls the operation of the vehicle so as to automatically stop the engine 210. That is, upon determining that the vehicle is at rest on the basis of the input accelerator opening information signal, vehicle speed information signal, and brake information signal, the HCU 332 outputs an engine drive stop command to the engine control section 338 to thereby stop the operation of the engine.

Further, when the operational state of the vehicle is such that the vehicle speed is equal to or lower than a predetermined level, such as during low-speed running, and the remaining capacity of the battery 400 is small, or the vehicle is under high-load running conditions, the HCU 332 preferably controls the operation of the vehicle to rotate the generator 270 via the operation of the engine 210 to thereby generate electric power, the generated electric power being supplied to the motor 230.

When the scooter type two-wheeled vehicle 100 is under high-load running conditions, the HCU 332 preferably controls the generator 270 and the motor 230 so as to impart to the rear wheel 107 the direct power from the engine 210 and the power from the motor 230. During high-load running, the motor 230 is driven by the electric power supplied from the battery 400 in addition to the electric power supplied from the generator 270. That is, because the operational state is that of high-load running, the motor 230 produces the maximum output of the vehicle by driving the rear wheel 107 together with the engine 210.

When the scoter-type two-wheeled vehicle 100 is running at high load and running at low-speed, the HCU 332 monitors the battery current from the battery opening sensor 311, in addition to the throttle opening (corresponding to the torque of the generator 270) from the throttle opening sensor 311 and the rotational speed of the generator 270 from the generator rotational speed sensor 306.

Because the current supplied from the generator 270 to the motor 230 exceeds the upper limit value during high-load low-speed running conditions, the HCU 332 supplies the surplus current to the battery 400.

In addition, during high-load low-speed running conditions, the current supplied from the generator 270 to the battery 400 increases, so as to exceed the permissible current level set for the battery 400, resulting in an overcurrent. For this reason, during high-load low-speed running conditions, the HCU 322 reduces the opening of the throttle valve 223 while keeping the rotational speed of the generator 270 at its upper limit value by controlling the generator 270.

The electric power control section 350 controls the current path based on motor drive information including motor torque information input from the HCU 332, thereby controlling the operation of the motor 230. The motor 230 is preferably equipped with an inverter 230a that converts the discharge output of the battery 400, which is input to the motor 230 through the electric power control section 350, from DC to AC, and that converts the regenerated output of the motor 230 from AC to DC for output to the electric power control section 350.

Further, the electric power control section 350 controls the current path based on generator drive information input from the HCU 332, including the rotational speed information and rotation speed information on the generator 270, thereby controlling the drive/stoppage of the generator 270. The generator 270 is preferably equipped with an inverter 270a that converts the generated output of the generator 270 from AC to DC for output to the electric power control section 350 and also converts the current input to the generator 270 from DC to AC.

Specifically, based on the output signal from the HCU 332, the electric power control section 350 causes the discharge current from the battery 400 to be supplied to the motor 230, or causes the electric power generated by the generator 270 to be supplied to the battery 400 or the motor 230. Further, based on the output signal from the HCU 332, the electric power control section 350 causes the regenerated output of the motor 230 to be supplied to the battery 400.

Herein, the output signal from the HCU 332 which is input to the electric power control section 350 is preferably based on the information input to the HCU 332 from the respective detecting sections 301 to 303 and the sensors 304 to 311.

Accordingly, in accordance with an operation on the accelerator or brake by the vehicle driver, the electric power control section 350 effects operation control so that the output torque of the motor 230 becomes equal to a value that corresponds to the operation on the accelerator or brake, while making reference to the rotational speed of the motor 230.

The engine control section 338 controls the operation of the engine 210 on the basis of engine drive information input from the HCU 332, including the engine drive command, the engine stop command, and a command value for the throttle valve opening upon engine drive.

Specifically, the engine control section 338 controls the operations of the ignition 222 (indicated by "IGN." in FIG. 3), the throttle value 223 (indicated by "THB." in FIG. 3), an injector 224 (indicated by "IGN." in FIG. 3), and a decompressor 225 (indicated by "DECOMP." in FIG. 3).

As described above, the engine control section 338 can directly rotate the rear wheel 107 by driving the engine 210, and can also rotate the rear wheel 107 by driving the motor 230 through the power distributor 250 and the generator 270. Further, by performing drive control on the engine 210, the engine control section 338 can supply the electric power generated by the generator 270 to the battery 400.

The battery 400 is preferably electrically connected to the generator 270, which is driven by the engine 210, through the electric power control section 350. The battery 400 supplies electric power to the motor 230 and also stores the electric power generated by the motor 230 or the generator 270.

With the scooter type two-wheeled vehicle 100 configured as described above, when the battery 400 is being charged and the vehicle is running under low-speed high-load running conditions, the amount of electric power supplied from the generator 270 to the battery 400 exceeds the permissible charging current for the battery 400. In this operating state, the HCU 332 preferably controls the operation of the vehicle so as to reduce the torque of the engine 210 in proportion to the speed while keeping the rotational speed of the generator 270, which rotates due to the drive of the engine 210, at its upper limit or not lower than 80% of the upper limit.

Figure 4:
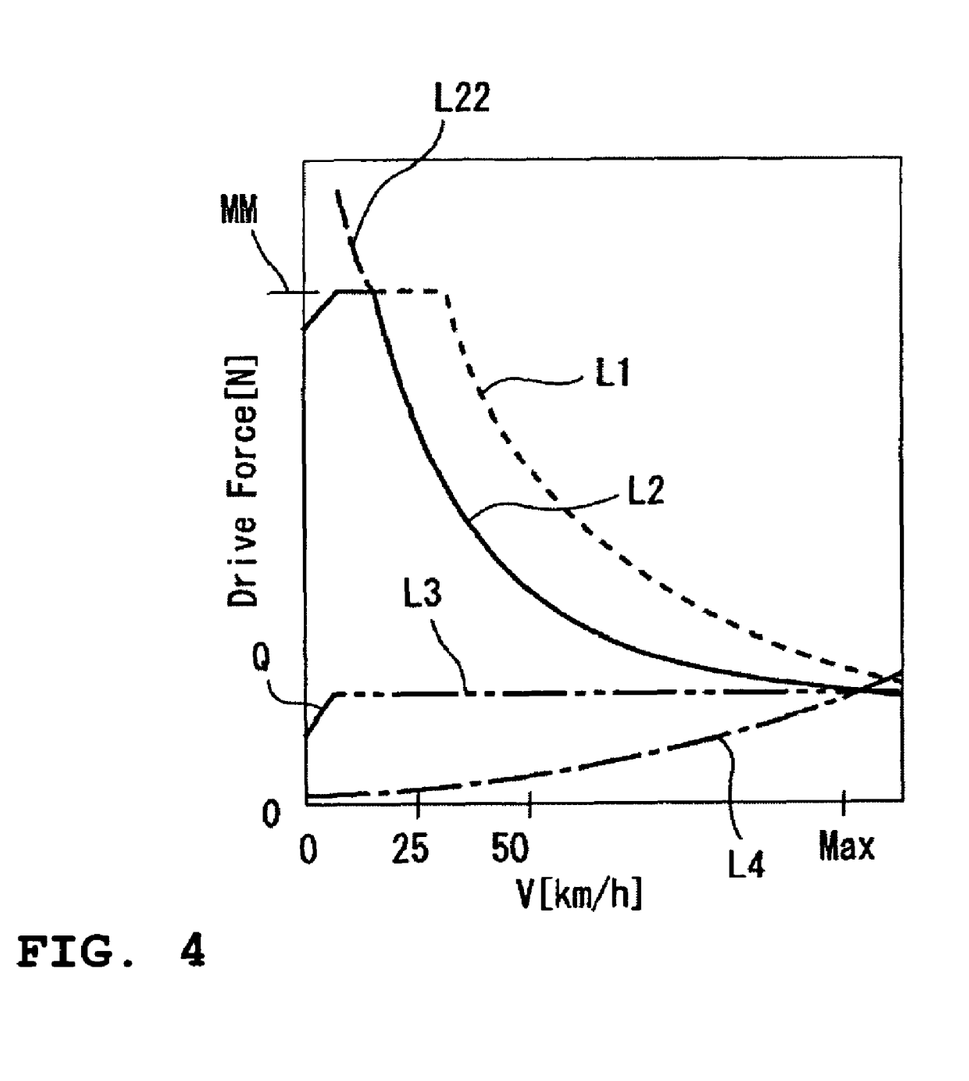
FIG. 4 is a diagram of the drive force versus vehicle speed performance of the scooter type two-wheeled vehicle having the drive controller in FIG. 1.

FIG. 4 is a diagram showing the drive force performance of the scooter type two-wheeled vehicle 100 having a drive controller, such as the drive controller 300 described above. Symbol L1 shown in FIG. 4 denotes a drive force graph representing the total output of the scooter type two-wheeled vehicle 100, and symbol L2 denotes a drive force graph indicative of the case where the ring gear 258 (see FIG. 2), that is, mechanical drive by the engine 210 is used, and also drive by the generator 270 is used. Further, symbol L3 denotes a drive force graph indicating mechanical drive by the engine 210 using the ring gear 258 (see FIG. 2). Further, symbol L4 denotes a drive force graph (hereinafter, referred to as the "running resistance curve") corresponding to the running resistance encountered during running on a flat surface.

In FIG. 4, the region between L1 and L2 corresponds to the amount of drive force due to the supply of electric power from the battery 400 to the motor 230, and the region between L2 and L3 corresponds to the amount of drive force due to the electric power generated by the generator 270 via the operation of the engine 210 that is supplied to the motor 230. Further, the portion from L3 and below corresponds to the drive force due to the operation of the mechanism including the power distributor 250 (see FIGS. 2 and 3), that is, the direct drive force of the engine 210. It should be noted that in FIG. 4, the position of the intersection between L2 and L4 indicates the maximum speed involving neither charging nor discharging of the battery 400. Further, the line indicated by a thrust MM corresponds to the line indicating the maximum permissible current for the motor 230 in the case where there is no limitation on the output of the generator 270.

With reference to FIG. 4, when the vehicle speed becomes equal to or lower than a predetermined speed (about 20 km/h), the graph L2 representing the drive force of the generator 270 exceeds the line of the thrust MM representing the maximum permissible current value for the motor 230. Within the vehicle speed range from the speed at which the graph L2 exceeds the line MM to the speed at which the thrust of the engine is rapidly decreased (about 8.9 km/h), the electric power generated by the generator 270 is supplied to the motor 230 and also to the battery 400, whereby the battery 400 is charged (the portion of the graph L2 indicated by symbol L22). It should be noted that when on the MM line, the battery 400 does not supply electric power to the motor 230.

Figure 5:
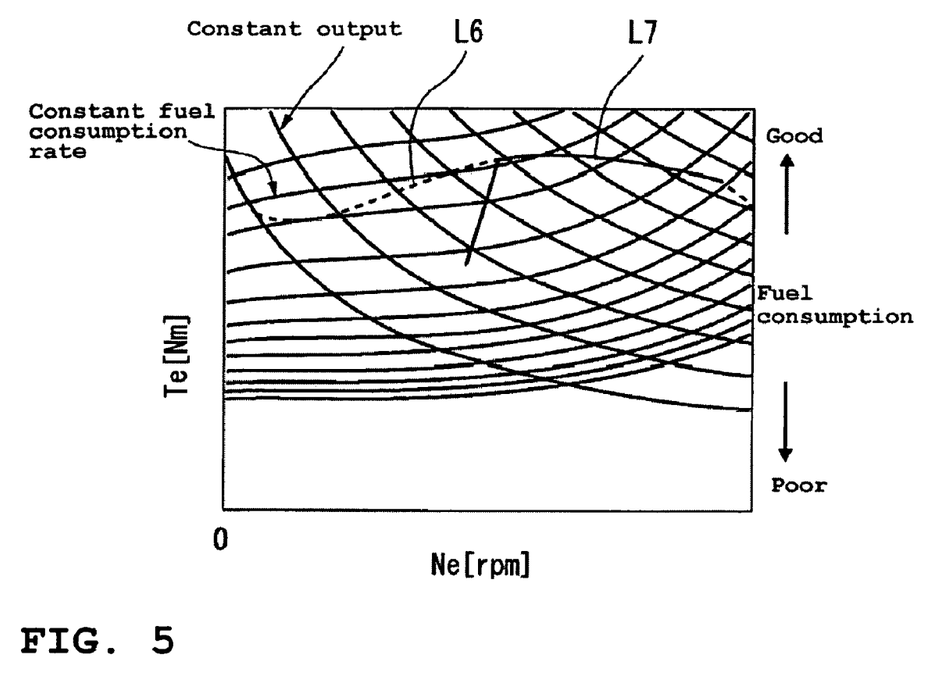
FIG. 5 is a diagram of engine torque and fuel consumption versus engine rotational speed representing the engine operation range, for explaining how engine power control is performed by the drive controller in FIG. 1.

Further, FIG. 5 is a diagram of an engine operation range for explaining how engine power control is performed by the drive controller according to one embodiment. In FIG. 5, the vertical axis represents engine torque (Te) and fuel consumption rate, the horizontal axis represents engine rotational speed (Ne), and the curves shown in FIG. 5 are constant output curves and constant fuel consumption rate curves. Further, L6 is a graph showing the maximum torque of the engine.

As shown in FIG. 4, during low-speed high-load running, the HCU 332 gradually reduces the drive force of the generator 270 in proportion to the vehicle speed.

That is, during low-speed high-load running conditions, the HCU 332 preferably controls the operation of the vehicle so as to drive the generator 270 via the operation of the engine and direct the resultant generated electric power to the charging of the battery 400. Depending on the vehicle speed, a state may occur in which the electric power supply from the battery 400 to the motor 230 is not performed. When, in this state, the electric power supplied from the generator 270 to the battery 400 exceeds the permissible charging current for the battery 400, the HCU 332 outputs to the engine control section 338 a command for reducing the torque of the engine 210 while keeping the rotational speed of the generator 270 at its upper limit or not lower than 80% of the upper limit.

Following this, as indicated by the graph L7 in FIG. 5, the engine control section 338 causes the engine 210 to reduce the engine torque at a predetermined rotational speed, thereby reducing the driving torque for the generator 270. As the driving torque for the generator 270 decreases, the current supplied from the generator 270 to the battery 400 also decreases. This prevents a current in excess of the permissible charging current for the battery 400 from flowing to the battery 400, thereby preventing problems such as heat generation by the battery 400.

Figure 6:
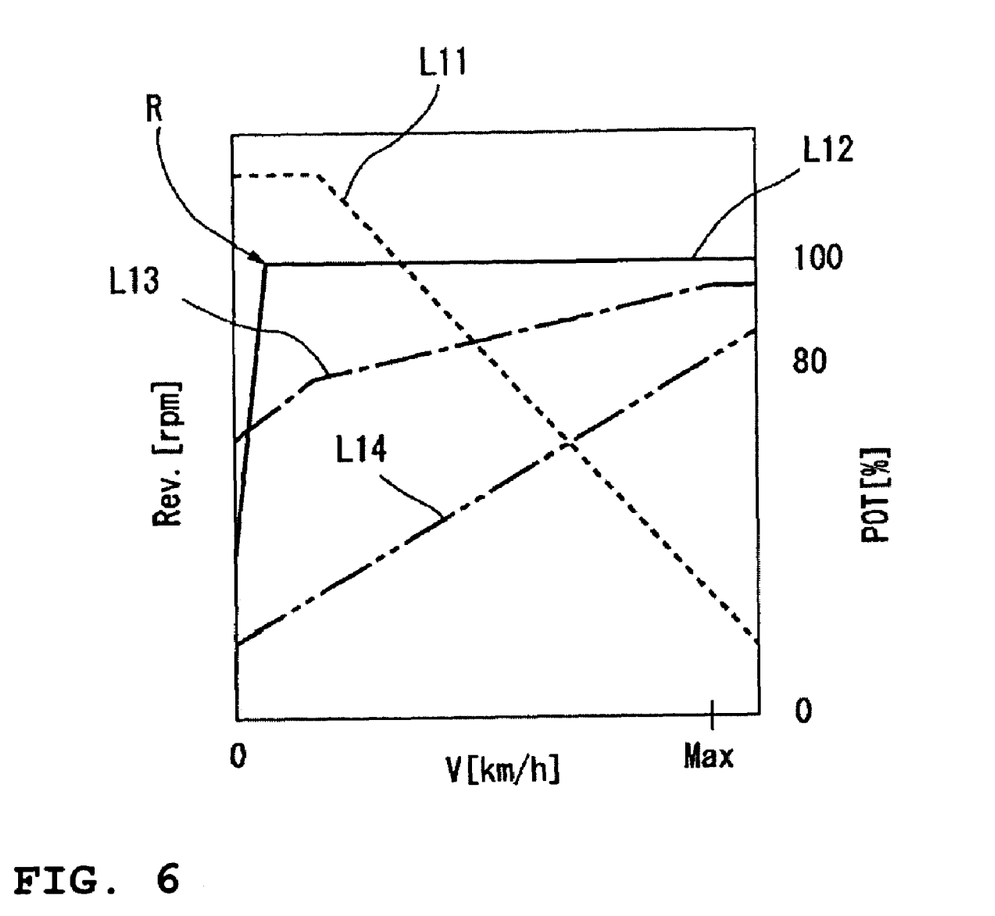
FIG. 6 is a diagram of engine speed and throttle opening versus vehicle speed for the respective components corresponding to those of FIG. 4.

FIG. 6 is a diagram showing the rotational speeds of the respective components corresponding to those of FIG. 4. In FIG. 6, the vertical axis represents the number of revolutions Rev (rpm) and throttle opening (POT: Part of Throttle (%)), and the horizontal axis represents vehicle speed V (km/h). With reference to FIG. 6, symbol L11 denotes rotational speed of the generator 270, symbol L12 denotes engine throttle opening, L13 denotes engine rotational speed, L14 denotes rotational speed of the ring gear, that is, the rotational speed of the motor 230.

As shown in FIG. 6, with the scooter type two-wheeled vehicle 100, when the vehicle speed is close to zero while the battery is being charged by the operation of the engine 210, the HCU 332 rapidly closes the throttle while keeping the rotational speed of the generator 270 at its upper limit or not lower than 80% of the upper limit.

That is, with the controller 300 of the scooter type two-wheeled vehicle 100, as shown in FIG. 4, when the battery 400 is being charged and when the vehicle is under low-speed high-torque running conditions (about 20 km/h or lower), the electric power supplied from the generator 270 to the battery 400 exceeds the permissible charging current for the battery 400 when the vehicle speed becomes a predetermined speed (about 8.9 km or lower). At this time, as shown in FIG. 6, the HCU 332 starts to reduce the throttle opening, that is, rapidly close the throttle from the point R of the graph L12. This causes the torque of the engine 210 to decrease in proportion to the speed while keeping the rotational speed of the generator 270, which is rotated by the drive of the engine 210, at its upper limit. Through this control, as indicated by the portion Q of the graph in FIG. 4, the thrust (drive force) of the mechanical drive by the engine 210 through the ring gear 258 also decreases.

Figure 7:
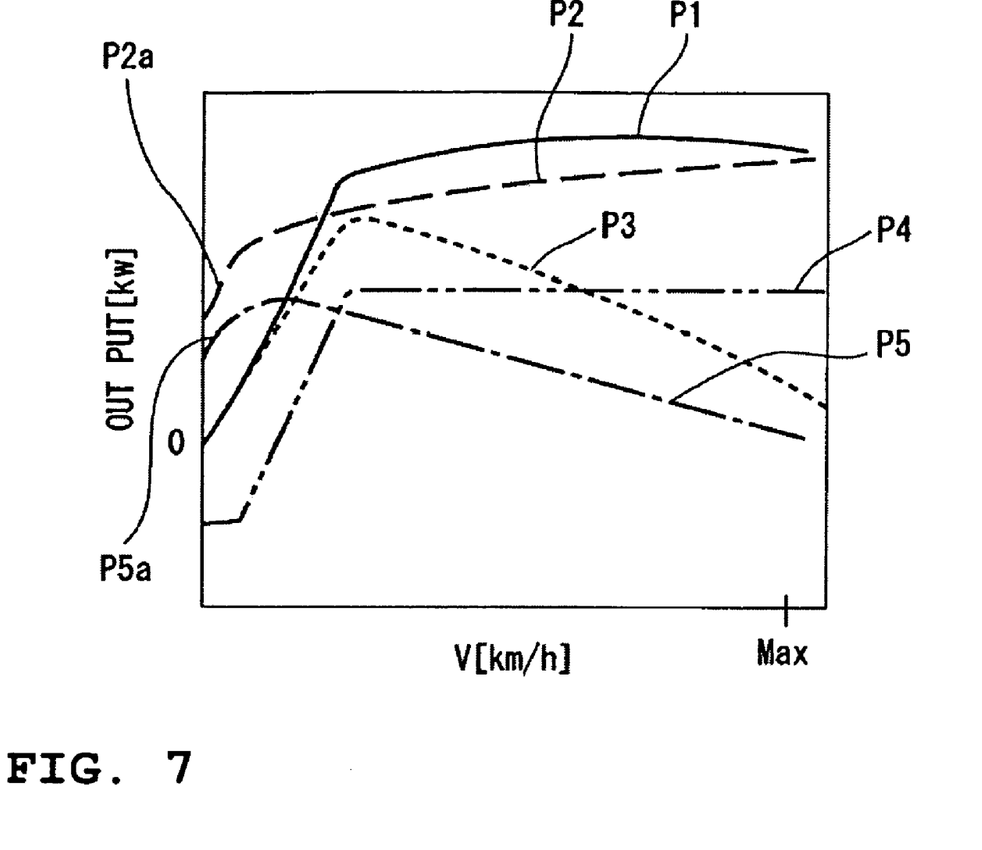
FIG. 7 is a diagram of the outputs of the respective components corresponding to those of FIG. 4.

FIG. 7 is a diagram showing the outputs of the respective components corresponding to those of FIG. 4.

In FIG. 7, symbol P1 denotes a graph indicating the output of the rear wheel 107 (see FIGS. 1 and 2), P2 denote a graph indicating the output of the engine 210 (see FIGS. 1 to 3), and P3 denotes a graph indicating the output of the motor 230 (see FIGS. 1 to 3). Further, in FIG. 7, symbol P4 denotes a graph indicating the output of the battery 400 (see FIGS. 1 to 3), and P5 denotes a graph indicating the output of the generator 270 (see FIGS. 1 to 3).

As shown in FIG. 7, during low-speed high-torque running, the HCU 332 of the scooter type two-wheeled vehicle 100 causes the output (P2) of the engine to decrease (P2a). Accordingly, the output (P5) of the generator also decreases (P5a).

As a result, the scooter type two-wheeled vehicle 100 prevents the stored charge capacity from decreasing following an increase in speed during low-speed high-load running while achieving sound running at maximum speed. As used herein, the expression "sound running" refers to running of the vehicle in which the electric power consumed by the vehicle running does not exceed the electric power generated during the running, that is, running of the vehicle in which the battery does not keep discharging while the vehicle is running at maximum speed on a generally flat road.

In view of this, with the scooter type two-wheeled vehicle 100, the relative ratio between the drive force graph L3 and the drive force graph L2 is set so as to ensure that the power graph L3 shown in FIG. 4 does not fall below the intersection between the drive force graph L2 and the running resistance curve L4. Meanwhile, it is known that in the case of a two-wheeled vehicle, the ratio of the output of the drive portion (which is generally the engine) with respect to the total weight is large in comparison to that of an automobile. For this reason, when applying a hybrid structure to a two-wheeled vehicle, it is necessary that one of the engine constituting the drive portion and the battery that supplies electric power to the motor be adapted to meet this requirement. However, the mounting area for the battery in a two-wheeled vehicle is limited, compared to an automobile, which also places a limitation on the volume of the battery. Accordingly, in the scooter type two-wheeled vehicle 100 according to this embodiment, the requisite value of the engine output relative to the overall output of the vehicle is increased so as to secure more than 70% of the maximum output of the drive unit as a whole, that is, the rear wheel constituting the drive wheel.

As described above, with the scooter type two-wheeled vehicle 100, during low-speed high-load running, the control unit 330, more specifically, the HCU 332 controls the engine 210 with the throttle opening being less than 100% while keeping the rotational speed of the generator 270 at its upper limit or not lower than 80% of the upper limit.

Accordingly, the charging current to be supplied to the battery 400 can be suppressed to a predetermined value by reducing the generated torque of the engine 210 and reducing the output of the generator 270. Therefore, the volume of the battery 400 to be mounted can also be reduced for easy mounting while meeting the constraints in terms of mounting to a two-wheeled vehicle, thereby realizing a hybrid vehicle having a power distributor, that is, a torque split mechanism by means of a two-wheeled vehicle.

While monitoring the rotational speed of the generator 270 and the throttle opening, the HCU 332 preferably causes the throttle opening to decrease while keeping the rotational speed of the generator 270 at its upper limit by controlling the generator 270 and the engine 210, before setting the throttle opening to approximately 50%.

Further, when the throttle opening has become approximately 50% due to the command from the HCU 332, the HCU 322 preferably controls the operation of the vehicle so as to reduce the rotational speed of the generator 270. The rotational speed of the engine 210 also decreases following the decrease in the rotational speed of the generator 270. When the rotational speed of the engine 210 has become equal to or lower than approximately 30% with respect to the maximum engine rotational speed, the HCU 332 stops the engine 210.

According to the structure described above, in order to prevent the current supplied from the generator 270 to the battery 400 from exceeding the value of the permissible charging current that is set for the battery 400, the throttle opening of the engine 210 is reduced while keeping the rotational speed of the generator 270 at its upper limit or not lower than 80% of the upper limit. The reduction in throttle opening allows a decrease in torque generated by the engine 210, thereby reducing the output of the generator 270 driven by the engine 210. Therefore, during vehicle running, such as low-speed high-load running, a situation can be avoided where the current supplied from the generator 270 to the battery 400 becomes larger than the permissible charging current value set for the battery 400. Accordingly, a hybrid drive unit can be controlled without increasing the volume of the battery. Further, an overcurrent can be prevented from being supplied to the battery 400, thereby achieving extended battery life. Further, the volume of the battery 400 can be reduced. Thus, according to the drive controller as described above, mounting to a vehicle with limited mounting space, such as a two-wheeled vehicle, is facilitated, thereby realizing a hybrid two-wheeled vehicle capable of effectively directing the output of the generator 270, which is generated by the operation of the engine 210, to the charging of the battery 400.

In another structure, the control section causes electric power to be supplied to the motor 230 from the generator 270, and when the electric power supplied to the motor 230 exceeds electric power consumption by the motor 230, causes the electric power generated by the generator 270 to be supplied to the battery 400 to charge the battery 400. Accordingly, in the case of a structure in which the electric power generated by the generator 270 is supplied to both the motor 230 and the battery 400 that supplies electric power to the motor 230, the output of the generator 270 generated by the operation of the engine 210 can be effectively directed to charge the battery 400.

In yet another structure, the driver controller further includes a power distributing mechanism for differentially distributing the power from the engine 210 to the generator 270 and to the drive wheel 107 and the motor 230, and the control section controls the operation of the generator 270 and the motor 230 to control a rotational speed of the engine 210 through the power distributing mechanism.

According to this structure, since the rotational speed of the engine 210 is controlled through the power distributing mechanism by controlling the operation of the generator 270 and motor 230, the rotational speed of the engine 210 can be indirectly determined by controlling the operation of the generator 270 and motor 230. Thus, there is no need to directly control the rotational speed of the engine 210, and the resultant absence of a component for controlling the engine rotational speed allows a reduction in cost.

According to another structure, a maximum output of the engine 210 is not lower than 70% of a maximum output of the drive wheel 107 that is rotated by the power of both the engine 210 and the motor 230, the motor 230 being driven by the electric power from the generator 270, which is driven by the engine 210, and from the battery 400.

Accordingly, while maintaining a sufficient maximum speed, the running of the vehicle can be continued without the electric power consumption by the motor 230 exceeding the electric power generated by the generator 270 due to the operation of the engine 210, that is, without the battery 400 continuing to discharge.

According to another structure, in order to prevent the current supplied from the generator 270 to the battery 400 from exceeding the value of the permissible charging current that is set for the battery 400, the throttle opening of the engine 210 is reduced while keeping the rotational speed of the generator 270 at its upper limit or not lower than 80% of the upper limit. The reduction in throttle opening allows a decrease in torque generated by the engine 210, thereby reducing the output of the generator 270 driven by the engine 210. Accordingly, even in situations where, during vehicle running such as low-speed high-load running, the current supplied from the generator 270 to the battery 400 may otherwise exceed the value of the permissible charging current set for the battery 400, the engine 210 can be controlled without increasing the volume of the battery 400. The reduced volume of the battery 400 enables mounting to a vehicle with limited mounting space, such as a two-wheeled vehicle, to thereby realize a hybrid vehicle. Further, an overcurrent can be prevented from flowing to the battery 400, thereby achieving extended battery 400 life.

The drive controller for a hybrid vehicle according to the embodiments described above advantageously makes it possible to reduce the battery volume in a hybrid drive unit that uses the drive controller, and can be advantageously applied to vehicles with limited mounting space, such as a two-wheeled vehicle.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims

What is claimed is:

1. A hybrid vehicle with a drive controller, the hybrid vehicle having an engine for generating power through fuel combustion, a generator driven by the engine for generating power, a battery charged by the generator, a motor driven by at least the electric power from the generator or the battery to generate power, and a drive wheel that is rotated by the power of at least one of the engine and the motor, the drive controller comprising:
   a control section configured to regulate the speed of the generator driven by the engine, and configured to charge the battery with the power generated by the generator; and
   a battery current detector producing a signal indicative of an amount of current supplied from the generator to the battery, the control section receiving the signal, the control section configured to cause a throttle opening of the engine to decrease while controlling the generator to keep a rotational speed of the generator above about 80% of an upper rotational speed limit, so as to inhibit the current supplied from the generator to the battery from exceeding a permissible charging current value set for the battery during the charging of the battery.

2. The hybrid vehicle according to claim 1, wherein the control section is configured to cause electric power to be supplied to the motor from the generator, and when the electric power supplied to the motor exceeds electric power consumption by the motor, causes the electric power generated by the generator to be supplied to the battery to charge the battery.

3. The hybrid vehicle according to claim 1, further comprising a power distributing mechanism configured to differentially distribute the power from the engine to the generator, the drive wheel and the motor, wherein the control section controls the operation of the generator and the motor to control a rotational speed of the engine through the power distributing mechanism.

4. The hybrid vehicle according to claim 1, wherein a maximum output of the engine is not lower than 70% of a maximum output of the drive wheel that is rotated by the power of both the engine and the motor, the motor being driven by the electric power from the generator, which is driven by the engine, and from the battery.

5. A hybrid vehicle with a drive controller, the hybrid vehicle having an engine for generating power through fuel combustion, a generator driven at least by the engine for generating power, a battery charged by the generator, a motor driven by at least the electric power from the generator or the battery to generate power, and a drive wheel that is rotated by the power of at least one of the engine and the motor, the drive controller comprising:
   a control section configured to regulate the speed of the generator driven by the engine, and configured to charge the battery while the engine generates a drive torque by controlling the electric power generated by the generator at least when a vehicle speed decreases below a predetermined speed; and
   a battery current detector producing a signal indicative of an amount of current supplied from the generator to the battery, the control section receiving the signal, the control section configured to cause a throttle opening of the engine to decrease while controlling the generator to keep a rotational speed of the generator above about 80% of an upper rotational speed limit.

6. A method for controlling the operation of a hybrid vehicle having an internal combustion engine, a generator driven by the engine to generate electric power, a battery charged with said electric power at least from the generator, and a motor that receives electric power from at least one of the generator and battery, at least one of the engine and motor driving a drive wheel of the vehicle, the method comprising:
   supplying electric power to the battery to charge the battery;
   detecting a current supplied to the battery; and
   controlling a rotational speed of the generator to maintain the rotational speed of the generator above about 80% of an upper rotational speed limit so as to inhibit the current supplied from the generator to the battery from exceeding a set charge current value for the battery.

7. The method of claim 6, further comprising controlling a throttle opening of the engine.

8. The method of claim 7, wherein controlling the throttle opening of the engine includes reducing the throttle opening to inhibit the current supplied from the generator to the battery from exceeding a set charge current value for the battery.

9. The method of claim 6, wherein supplying electric power to the battery to charge the battery comprises supplying electric power from the generator to the battery when electric power supplied to the motor exceeds electric power consumption by the motor.

* * * * *

UNITED STATES PATENT AND TRADEMARK OFFICE
CERTIFICATE OF CORRECTION

PATENT NO. : 7,413,042 B2  Page 1 of 1
APPLICATION NO. : 11/389514
DATED : August 19, 2008
INVENTOR(S) : Tetsushi Saitou and Arai Katsuhiro It is certified that error appears in the above-identified patent and that said Letters Patent is hereby corrected as shown below:

At sheet 7 of 7 (y-axis, Fig. 7), line 1, please delete "OUT PUT" and insert -- OUTPUT --, therefor.

At column 2, line 45, please delete "generating," and insert -- generating --, therefor.

At column 17, line 38, after "claims" please insert -- . --.

Signed and Sealed this

Twenty-eighth Day of April, 2009

JOHN DOLL
*Acting Director of the United States Patent and Trademark Office*